United States Patent
Nilsson et al.

(10) Patent No.: US 6,352,795 B1
(45) Date of Patent: Mar. 5, 2002

(54) LEAD BATTERY WITH ACID RESERVOIRS MIXED WITH ACTIVE MATERIAL IN PARTICLES

(75) Inventors: Ove Nilsson, Nol; Erik Sundberg, Helsingborg, both of (SE)

(73) Assignee: Volvo Technology Transfer AB, Gothenberg (SE)

(*) Notice: Subject to any disclaimer, the term of this patent is extended or adjusted under 35 U.S.C. 154(b) by 0 days.

(21) Appl. No.: 09/381,616
(22) PCT Filed: Mar. 23, 1998
(86) PCT No.: PCT/SE98/00530
  § 371 Date: Nov. 19, 1999
  § 102(e) Date: Nov. 19, 1999
(87) PCT Pub. No.: WO98/43309
  PCT Pub. Date: Oct. 1, 1998

(30) Foreign Application Priority Data
Mar. 23, 1997 (SE) ................................ 9701096

(51) Int. Cl.⁷ ............................ H01M 4/56; H01M 6/00
(52) U.S. Cl. .................. 429/225; 429/228; 429/226; 429/227; 29/623.1; 29/623.5
(58) Field of Search ........................... 429/225, 228, 429/226, 227; 29/623.1, 623.5

(56) References Cited
U.S. PATENT DOCUMENTS 5,468,575 A * 11/1995 Holland et al. ............... 429/56
5,474,863 A * 12/1995 Yamamoto .................. 429/225
5,582,937 A   12/1996 LaFollette .................. 29/623.1

FOREIGN PATENT DOCUMENTS

| DE | 3532697 | 4/1987 |
| EP | 0630063 | 12/1994 |
| WO | WO85/05227 | 11/1985 |
| WO | WO95/26055 | 9/1995 |

OTHER PUBLICATIONS

Patent Abstracts of Japan, vol. 8, No. 285, abstract of JP 59–151774 A (Shinkoube Denki K.K.), Aug. 30, 1984.

* cited by examiner

Primary Examiner—Gabrielle Brouillette
Assistant Examiner—Angela J. Martin
(74) Attorney, Agent, or Firm—Jacobson Holman, PLLC

(57) ABSTRACT

This invention concerns a method of increasing the available amount of acid at PAM and NAM in lead battery electrodes and still retain a short distance between the electrode surfaces. With mechanical support of PAM (for example in tubular batteries) in spite of low PAM densities it is possible to almost completely prevent the formation of mud. Spaces for acid should therefore be mechanically strong and supporting in order to retain unchanged PAM volume. In order to prevent that the porous bodies are filled with lead powder, lead sulphate or other components during manufacture, they may be impregnated with a filler material such as for example plastic or wax which is removed after forming the electrodes or after any other suitable process. The filler material may also be an inorganic salt which dissolves only at filling with acid leaving a desired porosity.

10 Claims, 4 Drawing Sheets

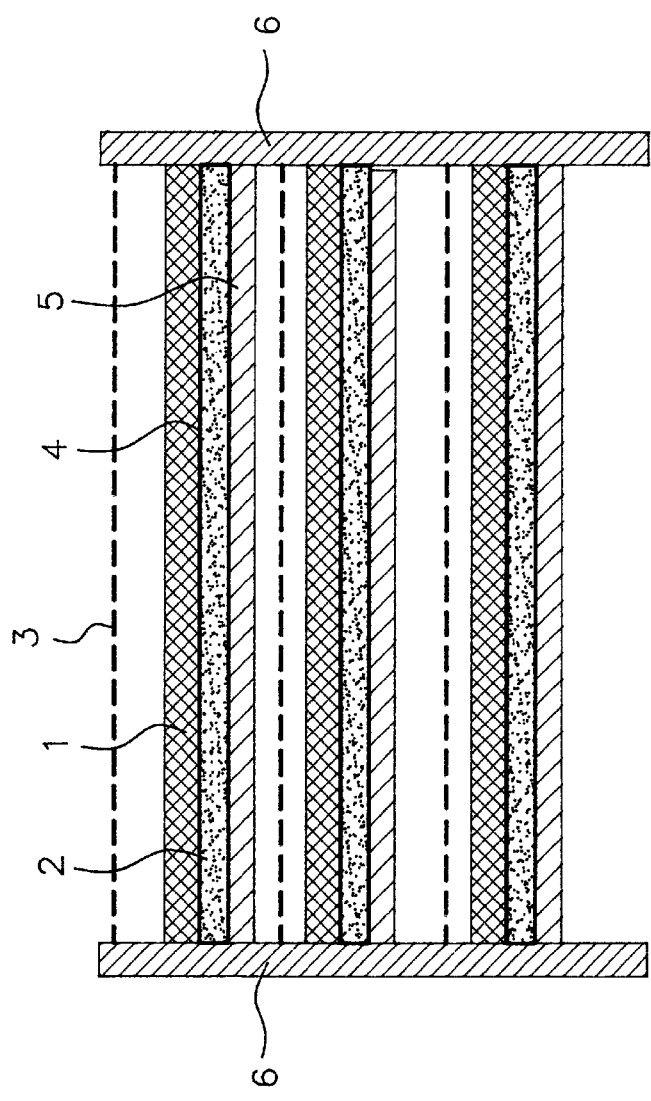
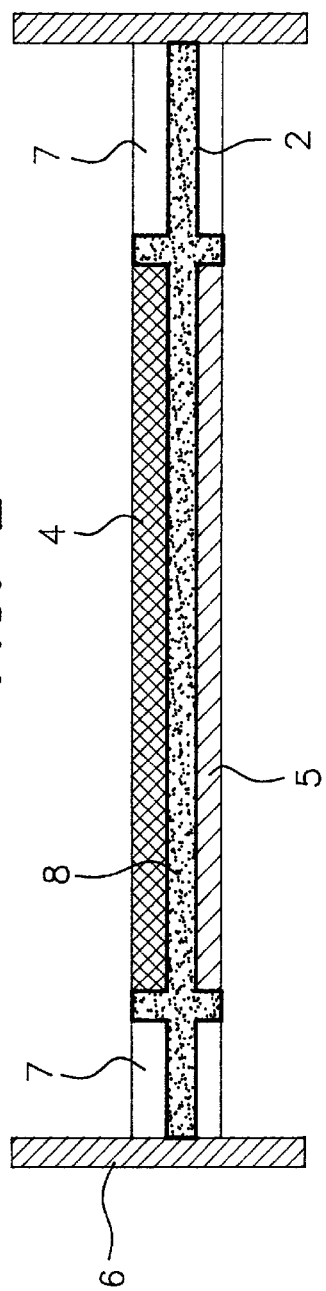

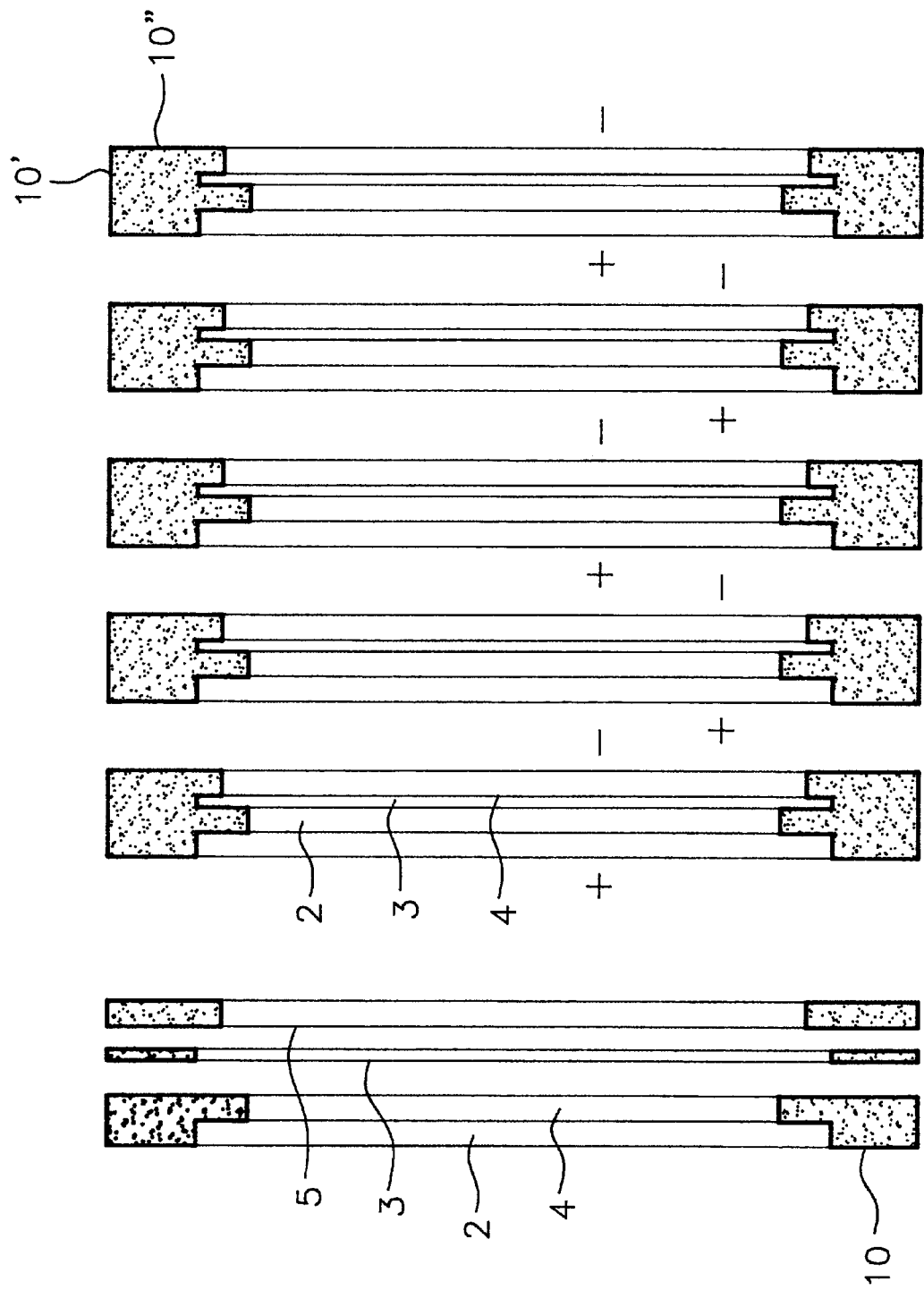

LEAD BATTERY WITH ACID RESERVOIRS MIXED WITH ACTIVE MATERIAL IN PARTICLES

BACKGROUND OF THE INVENTION

FIELD OF THE INVENTION

This application concerns a lead battery electrode and a method for its production.

The active components of a lead battery consist of porous $PbO_2$ (PAM, positive active material), porous Pb (NAM, negative active material) and sulphuric acid. As inactive material is considered vessels, separators, grids etc. Theoretically 4.463 g $PbO_2$, 3.866 g Pb and 3.660 g $H_2SO_4$ (concentrated) is needed to obtain 1 Ah. When utilization of PAM and NAM is inferior, the electrodes in the cells must be provided with considerably more of these components than what is calculated theoretically. Further, sulphuric acid may not be used effectively, on the one hand because it must be diluted with water to a density not exceeding 1.30–1.35 g/cm$^3$, on the other hand because it cannot be located such in the battery that the whole amount is coming in close contact with the electrodes. It is true that PAM and NAM due to its porosity include part of the necessary acid amount, but more acid is located in areas between the electrodes (in the separator), beside the electrodes and above the electrode package. There is often acid also below the electrode package but this amount of acid may only take part in the discharges to a small degree. The location of sulphuric acid just described is with respect to cells having vertical electrodes, in particular if they are monopolar. Bipolar electrodes may also function well in a vertical position but often horizontally functioning bipolar electrodes are preferred.

The most characteristic difference between bipolar and monopolar electrodes is that on the former at one side of an electron-conducting wall 2 has been placed PAM 3 and at the other side NAM (FIG. 1). The electron-conducting wall 2 is tight and separates the sulphuric acid from the adjacent cells. Another factor considered characteristic for bipolar electrodes is that the current at discharge is very evenly distributed over the electrodes which facilitate discharges with high currency. The inner resistance diminishes by the current between the cells going directly between the wall between PAM and NAM. Bipolar batteries are therefore used mainly for very high loads during short times, seconds down to milliseconds. A bipolar construction could be regarded as favourable also for its utilization of the so called oxygen gas recombination, by having a short distance between the electrodes in order to bring down the inner resistance of the cells. Oxygen recombination means that oxygen gas formed at the positive electrode during charge is transferred to the negative electrode and is reduced to water. This process is enhanced by a short electrode distance. In a monopolar construction having horizontal electrodes, the acid may as a contrast be allowed to freely circulate between the parallel coupled electrodes in one and the same cell.

Bipolar electrode may sometimes be called semi-bipolar depending on that each of the negative and the positive side respectively of the electrode is treated differently and is thereafter put together to a bipolar electrode.

Common for both kinds of electrodes is that between the positive and the negative electrode there must be a separator. In many cases this separator consists of a disc of a porous polymer having a porosity between about 60–80%. In other cases it may be comprised of microfine glass wool having a porosity of about 95%.

For the sake of the working life of these batteries, it is absolutely essential to have a relatively high pressure load on the electrode material. A suitable pressure may in the simplest way be brought about to horizontal electrodes and should be between 0.5 and 10 kg/cm$^2$ provided that the separators and the active material are not pressed so that they brake.

The capacity of a bipolar as well as a monopolar electrode is depending on the volume of acid which may be located at PAM, NAM and intermediate spaces. It is also possible to arrange spaces for extra acid outside the real electrode surface, that is the circumference of the cell is expanded without increasing the active electrode surface. The extra volume for acid being created will however be far away from the central parts of the electrode and thereby not only a long path has been obtained for transport of acid but also an uneven distribution of the current although the provisions for this are at hand in the bipolar construction as such. One could of course get larger space for the acid by increasing the distance between the electrodes, but because of the low conductivity of the electrolyte, the inner resistance will thereby increase and the oxygen gas recombination will suffer.

A usual and obvious way of increasing the provision of sulphuric acid in electrodes is to increase the porosity of PAM and NAM. This however brings about the risk of breaking the structure already after a rather small number of discharges.

Batteries having vertical electrodes have, as is mentioned, often a great part of the necessary acid volume placed above the electrodes. This acid is easily accessible since the difference in density in respect of that between the electrodes, after a time of discharge, is so great that convection currents will result. This has, however, a negative effect at charging. During the discharge, a large amount of acid has been bound in the electrode as lead sulphate. In the subsequent charge, this acid will be released, thereby, because of the difference in density with respect to the discharge outside the electrode, sinking downwards in the cell. Mixing of the electrolyte for example by circulation pumping or gas charging will then be necessary in order to level the resulted gradient and avoid stratifying.

SUMMARY OF THE INVENTION

This invention concerns reducing the problems of the known art and to provide a method of increasing the available amount of acid at PAM and NAM and still keep a short distance between the electrode surfaces.

This is achieved in a lead battery electrode by the features in that a great part of the amount of acid necessary for discharge is distributed into open space within or near the active material and that the spaces are given structure so that the structure comprise a mechanical support for the active material.

This way the accessibility of acid near the active material is ensured while maintaining support for this material which results in high strength and high mechanical resistibility.

The present invention defines preferred embodiments of the lead battery electrode, stating preferred constructions and arrangement of electrodes as such as well as of the porous particles which comprise support and acid reservoirs.

The invention also concerns a method of producing lead battery electrodes ensuring effective manufacture. Further the invention concerns a lead battery including electrodes. Further advantages of the invention will be apparent from the following.

The invention is describes with respect to bipolar electrodes, particularly such being constructed on a porous ceramic disc, which has been made electron-conducting by having the pores filled with lead (Sundberg, Nilsson U.S. Pat. No. 5,510,211) but is not limited to such electrodes but may be applied also in monopolar electrodes. The invention is further described in the FIGS. 1–7 without these embodiments comprising limitations of the invention.

DESCRIPTION OF THE DRAWINGS

FIG. 1 shows a section of a battery having horizontal bipolar electrodes 1, intermediate wall 2 which tightly adjoins the vessel walls, sulphuric acid electrolyte and separators 3.

FIG. 2 shows a section through a circular, semi-bipolar electrode having a ceramic, lead-filled intermediate wall 2 with the partition 8. PAM and NAM form the material layers 4 and 5 and the acid space 7 has been arranged at the periphery. The intermediate wall of the electrode is tightly joined with the vessel wall 6.

FIG. 7 shows a number of semi-bipolar electrodes 16 put together in pairs to 2V-units and ready to be assembled to a battery 17 with the desired voltage.

DESCRIPTION OF THE INVENTION

Figure 3:
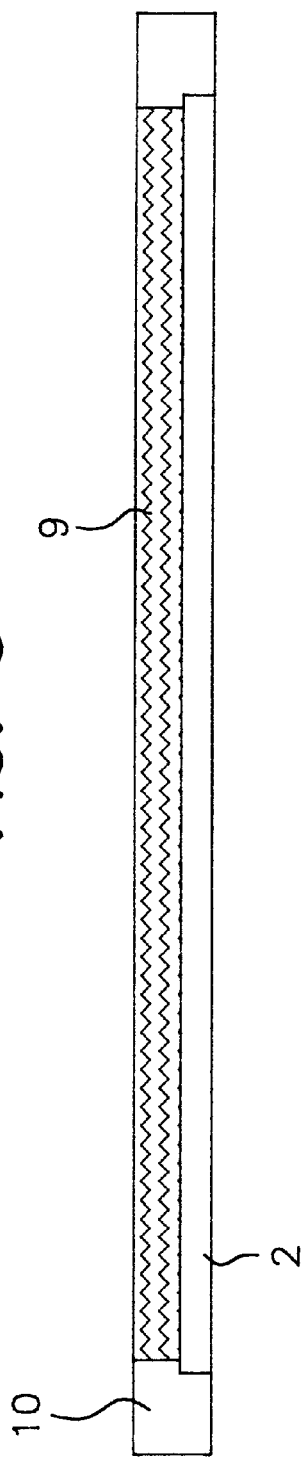
FIG. 3 shows a section through a circular, semi-bipolar electrode having ceramic lead-filled intermediate wall 2. PAM 9 includes porous particles in turn including acid. A circular plastic frame 10 is tightly adjoining 2.

It is here pointed out the necessity of a simultaneous support of all of the material over an outer applied pressure which has been achieved by pressing together the electrode package. From the Swedish Patent Application 9400946-1 it is known that such pressure may be pulsating, that is to accept a certain expansion of the active materials during discharge corresponding to the increased volume due to the formation of lead sulphate. At charge the material is retaining its original thickness by the spring action of the construction.

As was mentioned initially the electrodes may be made more porous than what is usual. The porosity is most often given as "Apparent Density" (AD) and is usually 3.6–4.2 g/cm$^3$ in positive electrodes and 4.0–4.5 g/cm$^3$ in negative electrodes. By a method which is described in U.S. Pat. No. 3,969,141 in tubular electrodes one has reached AD=2 g/cm$^3$. The method being described means that lead oxides are mixed with MgO which will form a supporting structure during forming, which is carried out in an alkalic environment. Thereby $\alpha$-PbO$_2$ is formed instead of $\beta$-PbO$_2$ and thereby a better mechanical strength and better conductivity is obtained. The support from MgO of course vanishes when the battery later is filled with sulphuric acid.

This invention concerns a method of arranging spaces for acid inside and immediately adjacent to the electrodes (distributed acid), preferably at the positive electrode, and thereby increase the availability of the acid for discharge times up to one hour (discharge with such a current that the battery is discharged within an hour). The invention at the same time concerns a method of arranging such spaces in such a way that a distance between the electrodes and thereby the resistance is not increased. Further the invention concerns a method of supporting the structure of the positive electrode.

Having mechanical support of PAM (for example in tubular batteries) in spite low PAM densities it is possible almost completely to prevent the formation of mud. The spaces for acid therefore should be mechanically strong and supporting in order to retain an unchanged PAM volume.

In principle according to the invention porosity can be created within the active material or between the layers of active material and the current conductor (grid) or, in a bipolar construction, in the intermediate wall 1. It is also possible according to the invention that acid is placed inside said intermediate wall, the conductivity of which may be made essentially higher than the conductivity of PAM and the acid. It is however essential at the same time to arrange so large a contact surface as possible between the current conductor 7 in the bipolar intermediate wall and PAM 5.

The invention has here been described with PAM and AM produced from a so called paste. In U.S. Pat. No. 5,510,211 instead of paste there has been used lead foils being attached to ceramic intermediate walls by electrolytic precipitation of lead or lead alloys against this lead foils. Such a method is applicable also on electrodes according to the invention. Thereby however, one should prevent the precipitations to form in the channels or other cavities which easily may be prevented if the walls in these cavities are covered with a layer of plastic, metal or other material impervious to sulphuric acid.

Another example of a bipolar construction is described in U.S. Pat. No. 5,582,937. The intermediate wall is comprised of a cup-shaped portion made of hardening plastic. Long carbon fibres in the plastic provides for the conductivity and contact with NAM. The contact surface between the fibres and PAM is covered with SnO$_2$. Such a method of manufacture may easily be changed so as to include any or some of the advantages of this invention.

Figure 4A:
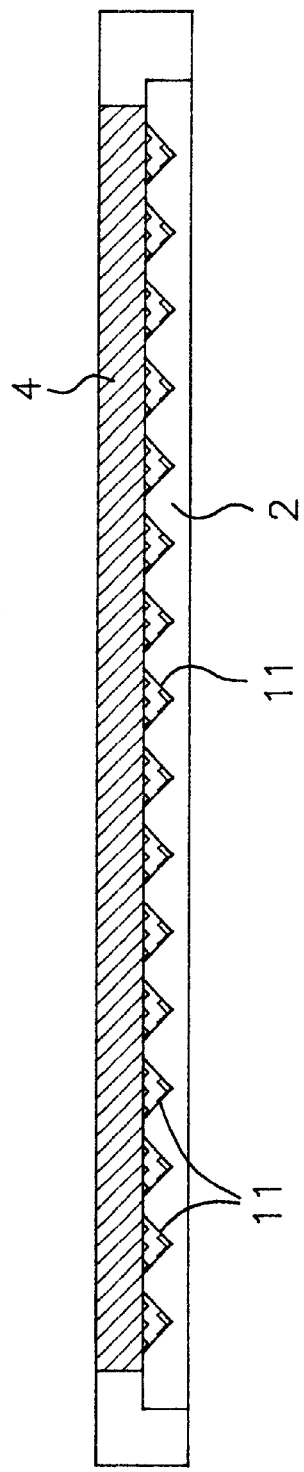
FIG. 4a and 4b show sections between circular, bipolar electrodes having ceramic lead-filled intermediate wall, where the intermediate wall has been provided with cavities 11 which in turn have been filled with porous material 12 as a support for the active material.
Figure 4B:
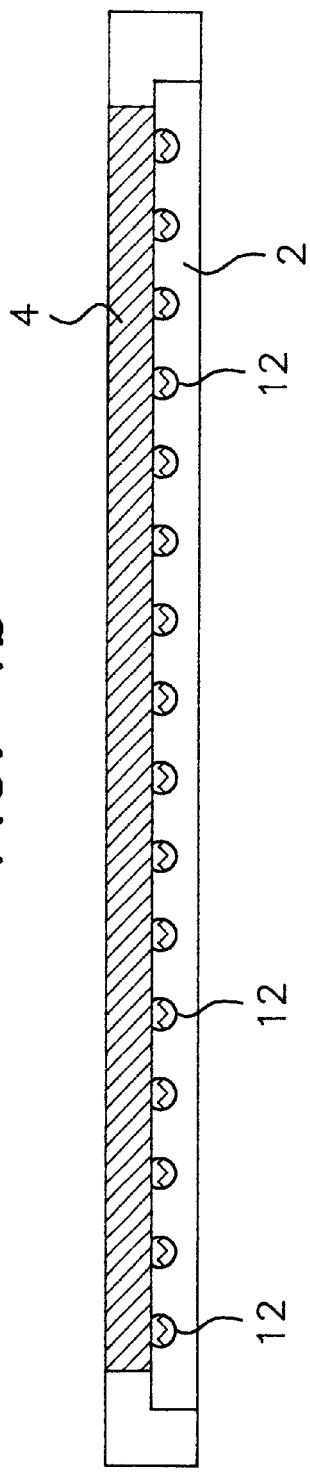
Figure 5:
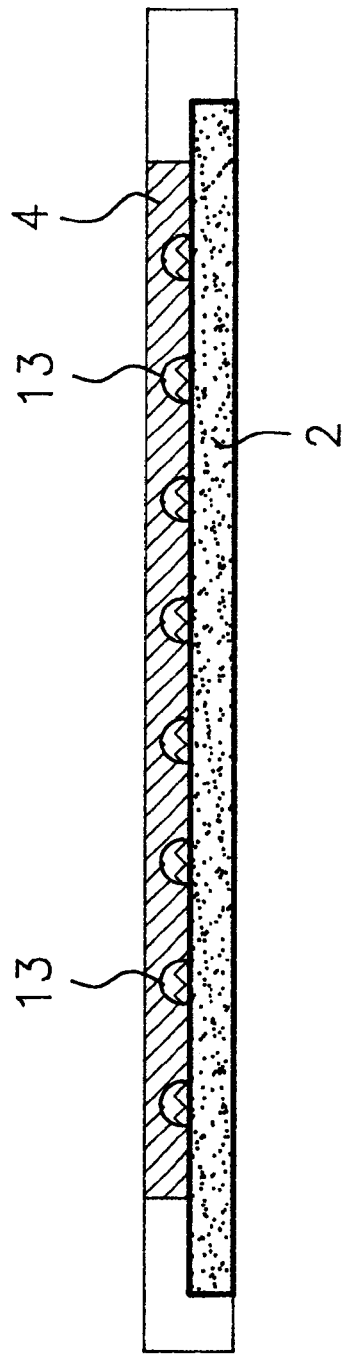
FIG. 5 shows a section between a circular, bipolar electrode having ceramic lead-filled intermediate wall 2, where the intermediate wall is provided with ridges 13 of porous material 12 as support for the active material.
Figure 6:
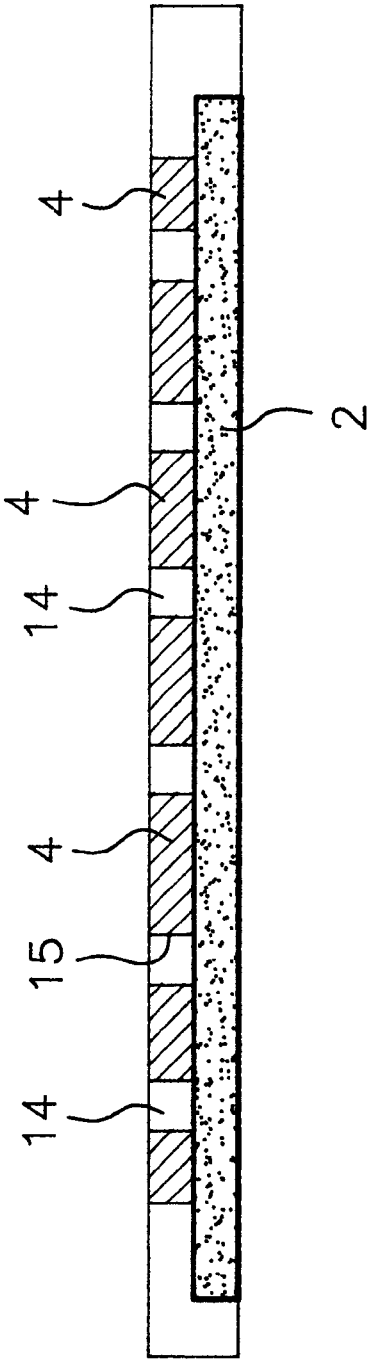
FIG. 6 shows a section through a circular, bipolar electrode having been provided with ring-shaped channels 14, the walls of which consisting of perforated titanium plate 15.

A mechanical support of PAM and NAM is according to the invention applied inside the cavities provided for acid so that they are not filled with mud particles of PbO$_2$ or Pb. Such support may be applied in the positive electrodes which is shown in FIGS. 2–7 but also in the negative electrode if necessary. The support is comprised of a porous mass or of particles having high porosity. The particles may in certain cases have been sintered together to a homogenous body which has been adapted to the cavity in question. In other cases they are comprised of small separate particles distributed randomly or in a regular manner in PAM and/or NAM. At least 50% porosity should be chosen for this supporting material and preferably the porosity should be between 65–85%. The supporting material may be comprised of a porous plastic, but since the most organic materials being in direct contact with PbO$_2$ easily oxidize such that they break, glass or ceramic materials are preferred.

The active material is produced by mixing water, sulphuric acid and lead compounds, such as lead oxides or basic lead sulphates in per se known manner to a density which in the formed state will be at least about 3.4–3.8 g/cm$^3$ in tubular electrodes an about between 4.0 and 4.5 g/cm$^3$ for NAM. See example 1.

The paste obtained this way is applied to the current conductors manually or in a particularly constructed machine. It is also possible to add active material as a powder which is the case in so called tubular electrodes, in which the powder is vibrated down or by applying to a surface to which it is fixed by pressing.

A certain volume porous particles may be added to such paste and will be distributed in the paste, and later when the wet paste is distributed to the grids in a per se known manner and having been dried, they will function as mechanical support. This support may be provided by said particles also to the formed paste, that is $PbO_2$ and Pb, respectively. In fact this is the essence of the invention, namely that the particles shall be porous in order to contain an essential amount of the sulphuric acid and at the same time provide mechanical support to the surrounding lead oxide or lead paste.

The volume of porous particles added to the paste may be greater or smaller than the volume of the paste itself. Usually the volume is chosen 0.5–1 times the volume of the paste, but this depends on the porosity of the filling material and which "Apparent Density" it is decided to give to the active material.

In order to prevent that the porous bodies are filled with lead dust, lead sulphate or other substances during the manufacture, they may be impregnated with a filling material such as for example plastic or wax, which after formation of the electrodes or after another suitable process is removed by heating, washing in a diluting agent etc. The filling material may also be an inorganic salt which dissolves only when filling with acid and leaving the desired porosity. Such a material may be for example water soluble $Na_2SO_4$ which, if the support bodies are made from a ceramic material, may be applied as a salt melt.

The filling material may also be made expanding so that a pressure is applied against the separate particles surrounding the filling body. An example of such an expanding body is microfine glass, which in the form of discs is impregnated with for example a salt solution or starch and is dried under pressure. The discs are cut to strips and divided into small cubes which are mixed with lead oxides to PAM. For example one could choose an aqueous solution of MgO as impregnation. This salt is not dissolved during mixing of the paste when pH>7, and the impregnated particles. Later, at contact with the sulphuric acid or the battery (in the formation process), the salt is dissolved and the glass wool will expand and provide a pressure against the surrounding paste.

Another method of obtaining extra acid and at the same time holding a certain pressure on the mass, is to include porous and resilient particles of for example rubber or other elastic bodies. Pores of the particles are filled with a water soluble glue which may be dried together with the rubber during compression, whereafter the particles are mixed with the paste to electrodes. When the glue has been dissolved in the electrolyte the particles will strive to retain there original volume. The dissolving or the glue may be delayed so that this will not occur until the formation of the electrodes is finished. This will occur for example by choosing a glue dissolving much quicker in battery acid having a density of 1.30 than in lower concentrations. It is also possible to eliminate glue by heating. If for example, the pores in the flexible material are filled with wax having a softening point of 135° C. or at least at a temperature which is higher than any process temperature, the electrodes may be activated by heating to >135° C.

In order to obtain a varying porosity within the active material, pasting may be arranged twice or several times, whereby for each new layer of paste being applied, the underlying layer has been dried and the new layers containing a reduced number of porous bodies. This brings about the possibility of higher porosity in the centre of the electrode and thereby good access to acid in this region.

Space for more acid can also be arranged outside PAM but in close contact as is shown in FIGS. 4–7. One could thereby arrange depressions in the intermediate wall.

A situation which this invention is particularly adapted to cope with is so called stratifying. When the electrodes begin to be charged, sulphuric acid is freed which, if the electrodes are standing vertically, pours down towards the bottom due to its higher destiny—the bulk acid is discharged. If no particular mixing is arranged and if the charge is not taking place during gas formation, densities of 1.40 $g/cm^3$ or more could be measured after a number of charges. Also with horizontal electrodes differences in concentration may occur for the same reason. In order to avoid this, according to the invention, these acid reservoirs are shaped as cavities under PAM and the acid which is formed at charge will be gathered din these cavities by stratifying. By this process on the one hand the acid in PAM will have low density during the end phase of the charge which is favourable, and further the acid reservoir will consist of rather highly concentrated acid which favours the transport (diffusion) of acid into the reaction locations in PAM.

The invention has been described above for batteries adapted for a discharge time of up to 1–3 hours. In certain cases there is a desire to discharge during longer times, for example 20 hours or up to 100 hours. In such cases still more acid is needed inside the battery, but it is not necessary that all this acid is placed in immediate neighbourhood of PAM and NAM. The extra acid needed is therefore placed in channels 14 in PAM and NAM. These channels are delimited which is showed in FIG. 6 which is favourable while otherwise PAM would grow heavily at such discharges without this support. The amount of acid in these channels is adapted to the amount of PAM and NAM existing immediately adjacent to the channel and a large number of channels may be arranged in order to get a good distribution to the acid. The support of the mass may be comprised of thin perforated rings of titanium or other material being able to withstand this environment. These channels are not necessarily filled with the previously mentioned supporting porous material but may be strong enough per se in order to resist the expansion of PAM but may occur. On the other hand it is possible to envisage that "ridges" 13 of sintered porous material is put inside the structure and is covered with the active material. Such ridges may easily be formed from plastic and be attached by gluing or by ceramic, so called green bodies, and thereafter be sintered to a hard and rigid construction.

It is also possible to form said channels as porous bodies which have been attached to the ceramic intermediate wall. These porous bodies may be made from a ceramic material which is advantageous considering their ability of resisting pressure stress.

EXAMPLE 1

A paste consisting of $4PbO.PbSO_4$ is being made of PbO (Biagetti and Weeks in The Bell System Technical Journal 49:7 September 1970, p.1305–1320) and is mixed with water and sulphuric acid to a paste having the density of 4.5 $g/cm^3$ in formed state. To 1,000 ml of this mass is added 1.5 Kg ceramic particles having 75% porosity and 3.2 g/cm3 material density. The particles are distributed evenly in the whole volume which now amounts to 2,875 ml. The average density is thus 2.08 g/cm$^3$ with the contents of 1.565 g PbO$_2$, 0.52 g ceramic particles and a free pore volume for the acid of 0.68 cm$^3$ per cm$^3$ electrode volume. At an acid density of 1.30 g/cm$^3$ that is 511 g/1000 ml or 5.21 mmol/ml 6.55 mmol PbO$_2$ will thus be surrounded by 3.54 mmol H$_2$SO$_4$. In comparison with a normally filled (3.6 g/cm$^3$) tubular electrode, the amount of acid in mmol per mmol PbO$_2$ has increased from 0.21 to 0.95 .

EXAMPLE 2

A bipolar electrode having a diameter of 20 cm and a layer of a positive active material which is 4 mm thick is provided with channels, that is a number of concentrically extending rings delimited by porous titanium plates. The mass density is 4.2 g/cm$^3$ PbO$_2$. A number of channels is 4 and the dimensions, position and acid contents is clear from table 1.

TABLE 1

| Channel No. | Width (mm) | Diameter outer (mm) | Diameter inner (mm) | Acid volume (cm$^3$) |
|---|---|---|---|---|
| 1 | 12 | 180 | 168 | 13.1 |
| 2 | 10 | 150 | 140 | 9.1 |
| 3 | 8 | 100 | 92 | 4.8 |
| 4 | 5 | 60 | 55 | 1.8 |
| Total of acid volume in channels | | | | 28.8 |

The weight of PAM is 97×4.2=407 g. The acid volume distributed in the electrode is the acid according to table 1 28.8 cm$^3$ and the acid in PAM (54%)=81 cm$^3$. The relation mol/mol acid/PAM will be 422/1703=0.25. For an electrode without channels and having AD=3.6 the corresponding relation would had been 399/1892=0.21.

In this example at the comparison the acid which would be located in the separator has been disregarded, but it can of course be made equally much in both cases.

What is claimed is:

1. A lead battery electrode having particles, said particles comprising:

acid reservoirs being mixed within the active material, so that an amount of acid necessary for discharge is distributed into spaces defined by the particles and the particles are structured such that the particles comprise a mechanical support for the active material, the particles are resilient, and expanding such that pressure is applied to surrounding active material.

2. The lead battery electrode according to claim 1, comprising a mix of lead dioxide and porous particles.

3. The lead battery electrode according to claim 1, wherein the particles are made from elastic porous bodies having pores and glue, the pores being filled with said glue that has dried under compression of the particles prior to mixing with paste to form the electrode.

4. The lead battery electrode according to claim 1, wherein the particles are made from microfine glass.

5. The lead battery electrode according to claim 1, wherein the active material has varying contents of porous and resilient particles such that porosity is higher in the center of the electrode than at the outermost surface.

6. A method for manufacturing lead battery electrodes, comprising the step of:

mixing active material with porous supporting particles to serve as acid reservoirs, and the porous and supporting particles are resilient and made expandable before mixing them with paste, forming the active material.

7. The method according to claim 6, wherein the particles are made from microfine glass which is impregnated with a salt solution and is dried during compression.

8. The method according to claim 6, wherein the particles are made from an elastic material, the pores of which are filled with glue, whereupon the particles are dried during compression.

9. The method according to claim 6, wherein the particles are made from microfine glass which is impregnated with a starch and is dried during compression.

10. A lead battery with separators, sulphuric acid and electrodes, said electrodes comprising:

a plurality of particles, each said particle including acid reservoirs mixed within active material, so that an amount of acid necessary for discharge is distributed into spaces defined by the particles and the particles are structured such that they comprise a mechanical support for the active material, said each of the particles are resilient, and expanding such that pressure is applied to surrounding active material.

* * * * *